United States Patent
Yang et al.

(10) Patent No.: US 9,556,060 B2
(45) Date of Patent: Jan. 31, 2017

(54) LOW DIELECTRIC CONSTANT GLASS FIBER

(71) Applicant: CHONGQING POLYCOMP INTERNATIONAL CORPORATION, Chongqing (CN)

(72) Inventors: Guoyun Yang, Chongqing (CN); Yuan Yao, Chongqing (CN); Cong Zhang, Chongqing (CN); Haishen Liu, Chongqing (CN); Lixiong Han, Chongqing (CN)

(73) Assignee: CHONGQING POLYCOMP INTERNATIONAL CORPORATION, Chongqing (CN)

( * ) Notice: Subject to any disclaimer, the term of this patent is extended or adjusted under 35 U.S.C. 154(b) by 0 days.

(21) Appl. No.: 14/724,126

(22) Filed: May 28, 2015

(65) Prior Publication Data
US 2015/0344352 A1    Dec. 3, 2015

(30) Foreign Application Priority Data

May 30, 2014 (CN) .......................... 2014 1 0238080

(51) Int. Cl.
*C03C 3/091* (2006.01)
*C03C 13/00* (2006.01)
*C03C 3/118* (2006.01)
*C03C 4/16* (2006.01)

(52) U.S. Cl.
CPC ............... *C03C 3/118* (2013.01); *C03C 4/16* (2013.01); *C03C 13/00* (2013.01); *C03C 3/091* (2013.01)

(58) Field of Classification Search
CPC .......... C03C 3/091; C03C 3/112; C03C 3/118; C03C 4/16; C03C 13/00
See application file for complete search history.

(56) References Cited

U.S. PATENT DOCUMENTS

| 4,824,806 A * | 4/1989 | Yokoi | H05K 1/0366 501/35 |
| 5,958,808 A * | 9/1999 | Mori | C03C 3/091 501/35 |
| 2003/0054936 A1* | 3/2003 | Tamura | C03C 3/091 501/35 |
| 2004/0175557 A1* | 9/2004 | Creux | C03C 3/118 428/299.7 |
| 2006/0287185 A1* | 12/2006 | Creux | H05K 1/0366 501/36 |
| 2008/0103036 A1* | 5/2008 | Boessneck | C03C 3/118 501/35 |
| 2012/0058878 A1* | 3/2012 | Li | C03C 3/091 501/38 |

FOREIGN PATENT DOCUMENTS

JP    2002201040 A * 7/2002
WO   WO 2010011701 A2 * 1/2010 ............ C03C 13/00

* cited by examiner

*Primary Examiner* — Elizabeth A Bolden
(74) *Attorney, Agent, or Firm* — Locke Lord LLP; Tim Tingkang Xia, Esq.

(57) ABSTRACT

A low dielectric constant glass fiber, in mass percentage, includes 50%~60% of $SiO_2$, 10%~20% of $Al_2O_3$, 12%~20% of $B_2O_3$, 0~4% of CaO, 4%~10% of MgO, 0.1%~0.5% of $Na_2O+K_2O$, 0~0.5% of $Li_2O$, 0.2%~3% of $F_2$ and 0~0.2% of $Fe_2O_3$. Compared with the related art, the glass composition contains higher content of $SiO_2$, which can greatly reduce dielectric properties of the glass fiber. Meanwhile, a small amount of $F_2$ is added thereto, which not only can effectively improve the fiberizing temperature of the glass fiber but also can reduce glass viscosity and density and reduce glass refractive index and dielectric properties. In addition, lower content of CaO is further contained, but almost no alkali metal particles such as $Na_2O+K_2O$ are contained, which further reduces the dielectric properties of the glass fiber.

4 Claims, No Drawings

LOW DIELECTRIC CONSTANT GLASS FIBER

CROSS-REFERENCE TO RELATED APPLICATION

This non-provisional application claims priority under 35 U.S.C. §119(a) on Patent Application No. 201410238080.4 filed in P.R. China on May 30, 2014, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention belongs to the field of glass fiber technologies, and particularly relates to a low dielectric constant glass fiber.

BACKGROUND OF THE INVENTION

With rapid development of the electronic information industry, a circuit board is required to have a lower dielectric constant and a lower dielectric loss, so as to make the circuit board have faster propagation speed and smaller propagation loss. For example, printed circuit boards are usually composed of resin and glass fiber. The resin for the printed circuit boards generally have good dielectric properties and can meet the needs of the printed circuit boards. Nowadays, for electric vehicles prevalent throughout the world, electric loss and calorific value of their battery pack system as the core are the bottleneck of restricting their development. Therefore, the dielectric properties of the glass fiber become key factors that restrict performance improvement of the printed circuit boards and batteries of new energy vehicles.

At present, the glass fiber commonly applied to circuit boards in the world mainly includes E glass fiber and D glass fiber. The E glass fiber is composed of: 52%~56% of $SiO_2$, 12%~16% of $Al_2O_3$, 5%~10% of $B_2O_3$, 16%~25% of CaO, 0~5.0% of MgO and 3%~5% of $Na_2O+K_2O$. The E glass fiber has good machinability, excellent water resistance, low price and other advantages. However, its dielectric constant is high, which is about 6.7, and its dielectric loss is greater, which is more than $10^{-3}$. Thus the E glass fiber cannot meet the requirements for high density and high-speed information processing.

The D glass fiber is composed of: 72%~76% of $SiO_2$, 0%~5% of $Al_2O_3$, 20%~25% of $B_2O_3$ and 3%~5% of $Na_2O+K_2O$. Its dielectric constant is about 4.1 and the dielectric loss is about $8\times10^{-4}$. But the D glass fiber has the following disadvantages: (1) comparing with the E glass fiber, the D glass fiber has higher content of $SiO_2$, resulting in that drilling performance of D glass fiber reinforced laminate is poor, which is not conductive to the subsequent machining; (2) the D glass fiber has a high glass softening point and poor fusibility, and is easy to produce veins and bubbles, resulting in problems such as difficult fiber drawing and more broken glass fiber in the spinning process, therefore, productivity and operationality are very poor, the production cost is high, and mass production is not easy; (3) the D glass fiber has a high melting temperature and a high fiber drawing temperature, generally more than 1400° C., is very strict in kiln quality, and will reduce the service life of the kiln; and (4) the D glass fiber has poor water resistance, and is easy to cause peeling of fiber and resin.

In order to obtain a glass fiber with better comprehensive performance, development of a glass fiber for printed circuit boards whose dielectric properties are comparable to those of the D glass fiber, for example, the dielectric constant is less than 4.5 and the dielectric loss is less than $8\times10^{-3}$, but whose manufacturability and operability are excellent, for example, the fiber drawing temperature is not more than 1350° C. and a difference between the fiber drawing temperature and the ceiling temperature of devitrification is greater than 50° C., and whose water resistance is comparable to that of the E glass fiber becomes one research focus.

The Chinese Patent Application No. CNO2810477.3 discloses a low dielectric constant glass fiber, typically composed of: 53% of $SiO_2$, 15.8% of $Al_2O_3$, 19.6% of $B_2O_3$, 5.3% of CaO, 3.9% of MgO, 0.5% of $Na_2O+K_2O$ and 1.2% of $P_2O_5$. The dielectric constant of this glass fiber is as high as 4.9, and $P_2O_5$ is added thereto which easily corrodes the kiln, resulting in higher requirements for the kiln.

The Chinese Patent Application No. CN96194439.0 discloses a low dielectric constant glass fiber, by weight, including: $SiO_2$ 50%~60%, $Al_2O_3$ 10%~20%, $B_2O_3$ 20%~30%, CaO 0~5%, MgO 0~4%, $Li_2O+Na_2O+K_2O$ 0~0.5% and $TiO_2$ 0.5%~5%. In this glass fiber, the content of CaO is reduced, its dielectric constant is about 4.2~4.5, and in order to improve melting performance, $TiO_2$ is introduced into the glass fiber. But too high content of $TiO_2$ will seriously affect the color of the glass fiber, which restricts applications thereof.

The Chinese Patent Application No. CN200780048402.7 discloses a low dielectric constant glass fiber, composed of: $SiO_2$ 52%~60%, $Al_2O_3$ 11%~16%, $B_2O_3$ 20%~30% and CaO 4~8%, its dielectric loss is $\leq 5\times10^{-4}$, but as the content of CaO is higher, resulting in that the dielectric constant is still high, which is 4.5~5.

The Chinese Patent Application No. CN200610166224.5 discloses a low dielectric constant glass fiber, composed of: 50%~60% of $SiO_2$, 6%~9.5% of $Al_2O_3$, 30.5%~35% of $B_2O_3$, 0~5% of CaO, 0~5% of ZnO and 0.5%~5% of $TiO_2$, where ZnO replaces part of the functions of CaO and MgO, to make the dielectric constant of the glass fiber reduced to 3.9~4.4, and the dielectric loss is $4\times10^{-4}$~$8.5\times10^{-4}$. But the fiber drawing temperature of the glass fiber is higher, generally greater than 1350° C., and the content of $B_2O_3$ is higher, which not only pollutes environments but also easily causes great composition fluctuation and increases corrosion to the kiln. In addition, the water resistance of the glass fiber is also poor.

The Chinese Patent Application No. CN200910216020.1 discloses a low dielectric constant glass fiber, composed of: 50%~60% of $SiO_2$, 12%~18% of $Al_2O_3$, 21%~27% of $B_2O_3$, 0~1.8% of CaO, 0.5%~3.2% of MgO, 0.5%~3.2% of ZnO, 0.4%~4% of $TiO_2$, 0.5%~3% of $CaF_2$ and 0.2%~0.6% of CeO. This glass fiber has good water resistance and good adhesion to resin, is easy for subsequent machining, has the dielectric constant of 4.2~4.6, and has other advantages. But its dielectric loss is still high, which is $10\times10^{-4}$~$12\times10^{-4}$, and it's content of $TiO_2$ is high, which is not conductive to the glass color.

SUMMARY OF THE INVENTION

In one aspect, the present invention provides a low dielectric constant glass fiber such that the glass fiber has good dielectric properties.

In one embodiment, a low dielectric constant glass fiber, in mass percentage, includes:

| | |
|---|---|
| $SiO_2$ | 50%~60%; |
| $Al_2O_3$ | 10%~20%; |
| $B_2O_3$ | 12%~20%; |
| CaO | 0~4%; |
| MgO | 4%~10%; |
| $Na_2O + K_2O$ | 0.1%~0.5%; |
| $Li_2O$ | 0~0.5%; |
| $F_2$ | 0.2%~3%; and |
| $Fe_2O_3$ | 0~0.2%. |

In one embodiment, the low dielectric constant glass fiber includes 2%~4% of CaO.

In one embodiment, the low dielectric constant glass fiber includes 0.05%~0.2% of $Li_2O$.

In one embodiment, the low dielectric constant glass fiber includes 0.01%~0.15% of $Fe_2O_3$.

In one embodiment, a low dielectric constant glass fiber, in mass percentage, includes:

| | |
|---|---|
| $SiO_2$ | 52%~58%; |
| $Al_2O_3$ | 13%~18%; |
| $B_2O_3$ | 15%~20%; |
| CaO | 2%~4%; |
| MgO | 4%~6%; |
| $Na_2O + K_2O$ | 0.1%~0.3%; |
| $Li_2O$ | 0.05%~0.2%; |
| $F_2$ | 0.5%~1.5%; and |
| $Fe_2O_3$ | 0.01%~0.15%. |

In one embodiment, in mass percentage, a glass fiber includes:

| | |
|---|---|
| $SiO_2$ | 53%~56%; |
| $Al_2O_3$ | 15%~18%; |
| $B_2O_3$ | 17%~20%; |
| CaO | 2%~3.5%; |
| MgO | 4%~6%; |
| $Na_2O + K_2O$ | 0.15%~0.3%; |
| $Li_2O$ | 0.15%~0.2%; |
| $F_2$ | 0.5%~1.5%; and |
| $Fe_2O_3$ | 0.05%~0.15%. |

In one embodiment, the present invention provides a low dielectric constant glass fiber. The low dielectric constant glass fiber, in mass percentage, includes: 50%~60% of $SiO_2$, 10%~20% of $Al_2O_3$, 12%~20% of $B_2O_3$, 0~4% of CaO, 4%~10% of MgO, 0.1%~0.5% of $Na_2O+K_2O$, 0~0.5% of $Li_2O$, 0.2%~3% of $F_2$ and 0~0.2% of $Fe_2O_3$. Compared with the related art, the glass composition according to certain embodiments of the present invention contains higher content of $SiO_2$, which can greatly reduce dielectric properties of the glass fiber. Meanwhile, a small amount of $F_2$ is added thereto, which not only can effectively improve the fiberizing temperature of the glass fiber but also can reduce glass viscosity and density and reduce glass refractive index and dielectric properties. In addition, certain embodiments of the present invention further includes lower content of CaO, but includes almost no alkali metal particles such as $Na_2O+K_2O$, which further reduces the dielectric properties of the glass fiber.

Experimental results show that the molding temperature of the low dielectric constant glass fiber provided according to certain embodiments of the present invention is about 1265° C., the molding range ÄT is between 80° C. and 100° C., the dielectric constant is about 4.7, and the dielectric loss is less than $10 \times 10^{-4}$.

These and other aspects of the present invention will become apparent from the following description of the preferred embodiment taken in conjunction with the following drawings, although variations and modifications therein may be effected without departing from the spirit and scope of the novel concepts of the disclosure.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

In one aspect, the present invention provides a low dielectric constant glass fiber. In one embodiment, the low dielectric constant glass fiber, in mass percentage, includes:

| | |
|---|---|
| $SiO_2$ | 50%~60%; |
| $Al_2O_3$ | 10%~20%; |
| $B_2O_3$ | 12%~20%; |
| CaO | 0~4%; |
| MgO | 4%~10%; |
| $Na_2O + K_2O$ | 0.1%~0.5%; |
| $Li_2O$ | 0~0.5%; |
| $F_2$ | 0.2%~3%; and |
| $Fe_2O_3$ | 0~0.2%. |

In the present invention, no special restrictions are made to the source of all raw materials, as long as they are commercially available.

At the frequency of 1 MHz, the dielectric constant of quartz glass is 3.8, the dielectric loss tangent is 0.0003. Thus higher content of $SiO_2$ may greatly reduce dielectric properties of glass fiber. The content of $SiO_2$ in the low dielectric constant glass fiber according to certain embodiments of the present invention is 50%~60%. When the $SiO_2$ content is below 50%, hydrolysis is too much, glass density is high, and the dielectric constant is too large. When the $SiO_2$ content is more than 60%, it will cause greater glass viscosity and a higher molding temperature, which is not conductive to fiber drawing. In certain embodiments of the present invention, the content of $SiO_2$ is preferably 52%~58%, more preferably 53%~57%, and most preferably 53%~56%.

In the glass fiber, when the content of $Al_2O_3$ is below 10%, it is easy to produce a split phase, leading to poor glass hydrolysis and a lower dielectric constant. When the $Al_2O_3$ content is more than 20%, the glass melting temperature will increase, the molding is difficult, and crystallization is easy. Therefore, in the low dielectric constant glass fiber according to certain embodiments of the present invention, the mass content of $Al_2O_3$ is 10%~20%, preferably 13%~18%, and more preferably 15%~18%.

In the glass fiber, $B_2O_3$, in addition to serving as a glass network structure filler, is also used as a cosolvent, so as to reduce the glass viscosity. However, after its content exceeds 20%, the water resistance of the glass fiber will be deteriorated sharply. Therefore, in the low dielectric constant glass fiber according to certain embodiments of the present invention, the mass content of $B_2O_3$ is 12%~20%, preferably 15%~20%, and more preferably 17%~20%.

In certain embodiments of the present invention, the content of CaO is preferably 2%~4%, more preferably 2%~3.5%, and most preferably 2%~3%.

In certain embodiments, the content of MgO is preferably 4%~8%, more preferably 4%~6.5%, and most preferably 4%~6%.

CaO and MgO are compositions that improve water resistance and chemical stability of the fiber glass.

According to certain embodiments of the present invention, the content of $Na_2O+K_2O$ is preferably 0.1%~0.3%, more preferably 0.15%~0.3%, and most preferably 0.15%~0.2%.

The low dielectric constant glass fiber according to certain embodiments of the present invention contains lower content of CaO and almost contains no alkali metal particles such as $Na_2O$ and $K_2O$. Therefore, the glass fiber has lower dielectric properties.

In certain embodiments, the low dielectric constant glass fiber contains no more than 0.5% of $Li_2O$, which can reduce glass viscosity and the molding temperature, and can also reduce the liquidus temperature and improve spinning stability. The content of $Li_2O$ is preferably 0.05%~0.2%, and more preferably 0.15%~0.2%.

In certain embodiments of the present invention, no more than 3% of $F_2$ is added thereto, which not only can effectively improve the fiberizing temperature but also can reduce glass viscosity and density and reduce glass refractive index and dielectric properties. The content of $F_2$ is preferably 0.5%~2%, more preferably 0.5%~1.5%, and most preferably 0.6%~1%.

$Fe_2O_3$ can reduce the production cost of the glass fiber, and in certain embodiments of the present invention, its content is preferably 0.01%~0.15%, more preferably 0.05%~0.15%, and most preferably 0.08%~0.12%.

The glass composition according to certain embodiments of the present invention contains higher content of $SiO_2$, which can greatly reduce dielectric properties of the glass fiber. Meanwhile, a small amount of $F_2$ is added thereto, which can not only effectively improve the fiberizing temperature of the glass fiber but also reduce glass viscosity and density and reduce glass refractive index and dielectric properties. In addition, certain embodiments of the present invention further include lower content of CaO, but almost include no alkali metal particles such as $Na_2O+K_2O$, which further reduces the dielectric properties of the glass fiber.

Experimental results show that the molding temperature of the low dielectric constant glass fiber provided in the present invention is about 1265° C., the molding range ÄT is between 80° C. and 100° C., the dielectric constant is about 4.7, and the dielectric loss is less than $10\times10^{-4}$.

In certain embodiments, there are no restrictions to the preparation method for the low dielectric constant glass fiber of the present invention. In one embodiment, the preparation method may be a well-known method in the industry. In one embodiment, the low dielectric constant glass fiber is preferably prepared according to the following method: mixing components of the low dielectric constant glass fiber according to mass fractions thereof, after the components are uniformly mixed, heating and melting the mixture, and after clarification, spinning and molding the mixture through a platinum bushing, to obtain the low dielectric constant glass fiber.

According to certain embodiments of the present invention, after uniform mixing, heating and melting is preferably carried out in a refractory unit kiln piled up with chrome oxide bricks and zirconia bricks; the temperature of the heating and melting is preferably 1450° C~1500° C.; and the time of the clarification is preferably 20~30 h.

To further describe the present invention, a low dielectric constant glass fiber provided in the present invention is described below in detail in combination with embodiments.

Reagents used in the following embodiments are all commercially available.

Embodiments 1-6

The components of the low dielectric constant glass fiber provided in each embodiment of the present invention and mass content thereof are as shown in Table 1. When the total content of the components is less than or greater than 100%, it can be understood as that, the remaining amount is equivalent to impurities or a few non-analyzed components, or caused by acceptable errors occurring in the analysis method adopted.

In Table 1, the preparation method for the low dielectric constant glass fiber in each embodiment is: weighing raw materials according to the composition and mass percentage shown in Table 1; after the raw materials are uniformly mixed, heating the mixture, in a refractory unit kiln piled up with chrome oxide bricks and zirconia bricks, to 1450° C~1500° C. and maintaining the temperature for melting; clarifying the mixture for 20~30 h; and spinning and molding the mixture through a platinum bushing, to obtain the low dielectric constant glass fiber.

In Table 1, $T_{log\varsigma=3}$ indicates the temperature when the glass viscosity is $10^3$ poise. This temperature is equivalent to the temperature of the glass liquid when the glass fiber is molded, is also called the fiber molding temperature, and is detected using a high-temperature viscometer.

$T_L$ indicates a glass liquidus temperature. This temperature is equivalent to the temperature when the glass crystallization rate is 0, and is also equivalent to the upper limit of the glass crystallization temperature. The temperature is detected using a glass crystallization gradient furnace.

ÄT indicates a difference of $T_{log\varsigma=3}-T_L$, which is equivalent to a molding range of the glass fiber.

In Table 1, the dielectric properties are tested according to the following method: mixing raw materials according to the components listed in Table 1; after the materials are uniformly mixed, putting the mixture into a platinum crucible; placing the platinum crucible in a high temperature resistance furnace, maintaining the mixture at 1450° C.~1500° C.; after the mixture is fully melted and clarified, quickly pouring the mixture into a mold, to make circular sheet glass; and polishing two sides of the sheet glass, to obtain a test sample. At the room temperature, the dielectric constant and the dielectric loss of the sample are tested at a frequency of 1 MHz.

TABLE 1

Compositions and performance test results of the low dielectric constant glass fiber

| Composition | Embodiment | | | | | | E glass | D glass |
| --- | --- | --- | --- | --- | --- | --- | --- | --- |
| | 1 | 2 | 3 | 4 | 5 | 6 | | |
| $SiO_2$ (%) | 53 | 55.7 | 56 | 56.2 | 55 | 56 | 54.4 | 73 |
| $Al_2O_3$ (%) | 18.3 | 17.5 | 17.1 | 16.7 | 16.3 | 15.8 | 14.5 | 1 |
| $B_2O_3$ (%) | 17.2 | 17.6 | 18.2 | 18.6 | 19.2 | 19.6 | 7.3 | 22 |
| CaO (%) | 2.0 | 2.0 | 2.0 | 2.3 | 2.8 | 3.2 | 22.1 | 0.6 |
| MgO (%) | 6.5 | 6.0 | 5.5 | 5.0 | 4.7 | 4.2 | 0.25 | 0.5 |
| $Na_2O + K_2O$ (%) | 0.3 | 0.15 | 0.15 | 0.15 | 0.15 | 0.15 | 0.9 | 2.9 |
| $Li_2O$ (%) | 0.35 | 0.15 | 0.15 | 0.15 | 0.15 | 0.35 | 0 | 0 |
| $Fe_2O_3$ (%) | 0.15 | 0.1 | 0.1 | 0.1 | 0.1 | 0.15 | 0 | 0 |
| $F_2$ (%) | 2.0 | 0.8 | 0.8 | 0.8 | 0.8 | 1.3 | 0 | 0 |
| Dielectric constant (1 MHz) | 4.7 | 4.7 | 4.7 | 4.6 | 4.6 | 4.4 | 6.6 | 4.2 |
| Dielectric loss (1 MHz, $\times 10^{-4}$) | 9 | 9 | 8 | 8 | 7 | 7 | 80 | 10 |
| $T_{log\varsigma=3}$ (° C.) | 1316 | 1309 | 1324 | 1326 | 1292 | 1265 | 1200 | 1410 |
| $T_L$ (° C.) | 1257 | 1231 | 1258 | 1251 | 1212 | 1180 | 1080 | 1250 |
| ÄT (° C.) | 59 | 78 | 66 | 75 | 80 | 85 | 120 | 160 |

It can be known from Table 1 that, the low dielectric constant glass fiber provided in the embodiments of the present invention has excellent balancing effects in dielectric properties and production difficulty. The dielectric constants are not more than 4.7, and the dielectric loss is equivalent to that of the D glass fiber. Moreover, the molding temperature of the low dielectric constant glass fiber provided in the embodiments do not exceed 1330° C., and the molding range ÄT is between 80° C. and 100° C., which can effectively improve the production efficiency and greatly improve the yield of the finished product. Therefore, compared with the D glass fiber, the low dielectric constant glass fiber provided according to certain embodiments of the present invention is more cost-effective and easier to implement large-scale production by direct-melt process. Compared with the E glass fiber, the dielectric properties thereof have significant advantages.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments are chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A glass fiber, in mass, comprising:

| | |
| --- | --- |
| $SiO_2$ | 50%-60%; |
| $Al_2O_3$ | 16.3%-18.3%; |
| $B_2O_3$ | 17.2%-19.6%; |
| CaO | 2%-4%; |
| MgO | 4%-10%; |
| $Na_2O + K_2O$ | 0.1%-0.5%; |

-continued

| | |
| --- | --- |
| $Li_2O$ | 0-0.5%; |
| $F_2$ | 0.2%-3%; and |
| $Fe_2O_3$ | 0.01%-0.15%. |

2. The glass fiber according to claim 1, wherein the mass percentage of $Li_2O$ is 0.05%-0.2%.

3. The glass fiber according to claim 1, in mass percentage, comprising:

| | |
| --- | --- |
| $SiO_2$ | 52%-58%; |
| $Al_2O_3$ | 16.3%-18.3%; |
| $B_2O_3$ | 17.2%-19.6%; |
| CaO | 2%-4%; |
| MgO | 4%-6%; |
| $Na_2O + K_2O$ | 0.1%-0.3%; |
| $Li_2O$ | 0.05%-0.2%; |
| $F_2$ | 0.5%-1.5%; and |
| $Fe_2O_3$ | 0.01%-0.15%. |

4. The glass fiber according to claim 1, in mass percentage, comprising:

| | |
| --- | --- |
| $SiO_2$ | 53%-56%; |
| $Al_2O_3$ | 16.3%-18.3%; |
| $B_2O_3$ | 17.2%-19.6%; |
| CaO | 2%-3.5%; |
| MgO | 4%-6%; |
| $Na_2O + K_2O$ | 0.15%-0.3%; |

-continued

| | |
|---|---|
| $Li_2O$ | 0.15%-0.2%; |
| $F_2$ | 0.5%-1.5%; and |
| $Fe_2O_3$ | 0.05%-0.15%. |

* * * * *